United States Patent
Schanderl et al.

(10) Patent No.: US 10,513,207 B2
(45) Date of Patent: Dec. 24, 2019

(54) DEVICE COMPRISING AN ADAPTER ELEMENT

(71) Applicant: GRAMMER AG, Amberg (DE)

(72) Inventors: Florian Schanderl, Schwarzenfeld (DE); Thomas Haller, Ursensollen (DE)

(73) Assignee: GRAMMER AG, Amberg (DE)

(*) Notice: Subject to any disclaimer, the term of this patent is extended or adjusted under 35 U.S.C. 154(b) by 197 days.

(21) Appl. No.: 15/666,992

(22) Filed: Aug. 2, 2017

(65) Prior Publication Data

US 2018/0050618 A1    Feb. 22, 2018

(30) Foreign Application Priority Data

Aug. 17, 2016   (DE) .................. 10 2016 115 266

(51) Int. Cl.
| | | |
|---|---|---|
| *B60N 2/68* | (2006.01) | |
| *B60N 2/225* | (2006.01) | |
| *B60N 2/22* | (2006.01) | |
| *B60N 2/30* | (2006.01) | |

(52) U.S. Cl.
CPC .............. *B60N 2/682* (2013.01); *B60N 2/22* (2013.01); *B60N 2/225* (2013.01); *B60N 2/3011* (2013.01); *B60N 2002/684* (2013.01)

(58) Field of Classification Search
CPC ...... B60N 2/682; B60N 2/225; B60N 2/3011; B60N 2002/684; B60N 2/22
USPC ............................... 297/362, 354.13, 354.12
See application file for complete search history.

(56) References Cited

U.S. PATENT DOCUMENTS

| 5,263,763 A | 11/1993 | Billette | |
|---|---|---|---|
| 6,398,300 B1 * | 6/2002 | Young | B60N 2/682 |
| | | | 297/216.13 |
| 8,523,284 B2 * | 9/2013 | Yamada | B60N 2/22 |
| | | | 297/216.13 |

(Continued)

FOREIGN PATENT DOCUMENTS

| DE | 10 2015 009 094 A1 | 1/2017 |
|---|---|---|
| FR | 2842476 | 1/2004 |
| WO | WO 2003/022 622 A1 | 3/2003 |

OTHER PUBLICATIONS

Search Report prepared by the German Patent Office dated May 10, 2017, for German Patent Application No. 10 2016 115 266.8.

(Continued)

*Primary Examiner* — Milton Nelson, Jr.
(74) *Attorney, Agent, or Firm* — Sheridan Ross P.C.

(57) ABSTRACT

Device for connecting a region, which is lower when viewed in the vehicle seat height direction, of a backrest to a region, which is rear when viewed in the vehicle seat length direction, of a seat part of a vehicle seat, a tilt adjustment device which is rotatable about a first axis of rotation extending in the vehicle seat width direction for adjusting a tilt of the backrest relative to the seat part being connected to the seat part, wherein the device comprises an adapter element which is rigidly connected to the tilt adjustment device and is rotatable about the first axis of rotation, which element has a first recess which extends at a first angle to a backrest length direction, the first recess being able to be connected to a first tab which is arranged on the backrest and is formed so as to be complementary to the first recess.

10 Claims, 22 Drawing Sheets

(56) References Cited

U.S. PATENT DOCUMENTS

| | | | | |
|---|---|---|---|---|
| 2007/0029860 A1* | 2/2007 | Yamada | ............... | B60N 2/22 |
| | | | | 297/440.21 |
| 2011/0043022 A1* | 2/2011 | Nasshan | ............... | B60N 2/22 |
| | | | | 297/354.12 |
| 2011/0127821 A1* | 6/2011 | Wojatzki | ............ | B60N 2/2358 |
| | | | | 297/354.12 |

OTHER PUBLICATIONS

Official Action with English Translation for China Patent Application No. 201710658589.8, dated Mar. 28, 2019, 2 pages.

* cited by examiner

DEVICE COMPRISING AN ADAPTER ELEMENT

CROSS-REFERENCE TO RELATED APPLICATIONS

This application claims the benefit of German Patent Application No. DE 10 2016 115 266.8 filed Aug. 17, 2016, the entire contents of which are incorporated herein by reference.

FIELD

The invention relates to a device for connecting a region, which is lower when viewed in the vehicle seat height direction, of a backrest to a region, which is rear when viewed in the vehicle seat length direction, of a seat part of a vehicle seat, a tilt adjustment device which is rotatable about a first axis of rotation extending in the vehicle seat width direction for adjusting a tilt of the backrest relative to the seat part being connected to the seat part and the backrest.

BACKGROUND

Vehicle seats of this type are known from the prior art. In the present case, the tilt adjustment device is connected to both the seat part and the backrest. By operating the tilt adjustment device, the tilt of the backrest relative to the seat part can be altered so that the vehicle seat can be adapted for a person's comfort.

Mounting or assembly of a vehicle seat of this type is time-consuming, however, and often requires the service of multiple people, since the backrest must be held and positioned relative to the seat part by one person, and at the same time, the backrest must be screwed together with the seat part.

SUMMARY

It is accordingly an object of the present invention to provide a device and a method by means of which the connection between the backrest and the seat part and/or mounting of the vehicle seat can be simplified.

This object is achieved according to the features of claim 1. Advantageous embodiments of the invention can be found in the dependent claims.

The core concept of the invention is to provide a device for connecting a region, which is lower when viewed in the vehicle seat height direction, of a backrest to a region, which is rear when viewed in the vehicle seat length direction, of a seat part of a vehicle seat, a tilt adjustment device which is rotatable about a first axis of rotation extending in the vehicle seat width direction for adjusting a tilt of the backrest relative to the seat part being connected to the seat part and the backrest, wherein the device comprises an adapter element which is rigidly connected to the tilt adjustment device and is rotatable about the first axis of rotation, which element has a first recess which extends at a first angle to a backrest length direction, the first recess being able to be connected to a first tab which is arranged on the backrest and is formed so as to be complementary to the first recess.

Particularly preferably, the adapter element is welded, screwed, riveted or the like to the tilt adjustment device, a welded connection being preferred. By operating the tilt adjustment device, that is to say rotating the tilt adjustment device about the first axis of rotation, as a result of the rigid connection of the adapter element to the tilt adjustment device, the adapter element is likewise rotated about the first axis of rotation.

The first recess and the tab which is connected thereto and formed so as to be complementary thereto limit, by means of the connection to one another, the degree of freedom of the backrest relative to the seat part through the adapter element. By restricting or decreasing the degree of freedom, the backrest can be better arranged relative to the seat part and accordingly said parts can also be better interconnected.

Particularly preferably, a plurality of devices are provided, for example a device on the left-hand side of the seat part and a device on the right-hand side of the seat part.

According to the arrangement according to the invention of the adapter element rigidly connected to the tilt adjustment device, the first angle is constant, since, by rotating the tilt adjustment device, the adapter element and the backrest are rotated to the same extent about the first axis of rotation.

According to a particularly preferred embodiment, the backrest can be even better arranged relative to the seat part if the backrest comprises a second recess which can be brought into operative contact with a bolt element which is rigidly connected to the adapter element and is arranged so as to be able to rotate about the first axis of rotation.

By means of the tab connection, consisting of a tab and a first recess, the radial movement of the backrest relative to the seat part can be restricted. By means of the second recess and the connection thereof to the bolt element, the backrest no longer has to be held relative to the seat part by a person. In particular, the backrest can simply be placed on the adapter element, and therefore in particular on the seat part, by means of the first and second recess, the bolt element and the tab.

Preferably, the bolt element is rigidly connected to the adapter element and rotates during rotation of the adapter element, caused by operating the tilt adjustment device, likewise about the first axis of rotation.

According to a particularly preferred embodiment, the bolt element comprises at least one planar region which, when viewed in the vehicle seat width direction, encloses a second angle together with the backrest length direction.

According to another preferred embodiment, the device comprises a coil spring which is connected to the bolt element by a first coil spring end, the second coil spring end interacting with a first stop element of the adapter element and/or with a second stop element of the seat part.

If, in this case, the bolt element comprises at least one planar region, and if the first coil spring end is formed so as to be complementary thereto, then the coil spring is arranged in a stationary manner relative to the bolt element.

The second stop element is accordingly arranged in a stationary manner relative to the seat part, whereas the first stop element is arranged in a stationary manner relative to the adapter element and, during a rotation of the adapter element, is correspondingly rotated about the first axis of rotation.

The more precise configuration and mode of operation of the first and second stop elements with the coil spring is shown in greater detail in the following.

Similarly to the first recess, the first stop is also arranged at a specific third angle relative to the backrest length direction. The second stop, which is arranged in a stationary manner relative to the seat part, is arranged at a constant fourth angle relative to the vehicle seat height direction.

If the backrest is rotated about the first axis of rotation, then the angle between the backrest length direction and the vehicle seat height direction constantly changes. It can therefore occur that, when viewed in a radial direction away from the first axis of rotation, the first and second stop elements are arranged on the same radial stretch. In this case, the coil spring is preloaded.

In this case of the first and second stop elements coinciding, the coil spring, in particular the second coil spring end, is in operative contact with both the first and the second stop element. If the backrest is now rotated further forwards in the vehicle seat length direction, then the first stop element, and likewise the second coil spring end, is correspondingly rotated together therewith. As a result, the second coil spring end still remains in contact with the first stop element, and at the same time, the contact between the second coil spring end and the second stop element is released.

As a result of the fact that the first coil spring end is arranged in a stationary manner relative to the adapter element by means of the bolt element, and likewise the first stop element is arranged in a stationary manner on the adapter element, the preload of the coil spring is unchanged, and therefore the backrest can be folded forwards without applying force.

If, however, the backrest is moved backwards in the vehicle seat length direction, then the situation changes. The second coil spring end is still in operative contact with the second stop element, and the first stop element is moved away from the second coil spring end. If the adapter element with the coil spring is moved further backwards about the first axis of rotation, then the preload of the coil spring is changed, since the first coil spring end is moved correspondingly to the adapter element, and the second coil spring end is still in contact with the second stop element.

According to another embodiment, the coil spring is arranged between the backrest and the adapter element.

According to a particularly preferred embodiment, the tab and the second recess can easily be arranged on the backrest if an adapter housing which comprises the tab and the second recess is arranged on the backrest, the adapter housing being able to be connected to the adapter element, for example by means of screw connections or the like.

In addition, the coil spring can be protected by means of the adapter housing, and the person or persons can also be protected from the coil spring if the coil spring is arranged between the adapter housing and the adapter element.

According to one embodiment, the installation space can be optimised if the adapter element comprises a first and a second region, the first region being arranged in a first plane, and the second region being arranged in a second plane, the first plane and the second plane being formed in parallel with one another.

Preferably, the second region is formed in such a way that it substantially corresponds to the shape of the coil spring.

The adapter element accordingly comprises a third and a fourth region, the third region being arranged in a third plane, and the fourth region being arranged in a fourth plane, and the third plane and the fourth plane being formed in parallel with one another. Analogously to the second region, the fourth region is designed in such a way that it substantially corresponds to the shape of the coil spring.

Particularly preferably, the first and the third region comprise passages so that said regions can be interconnected by means of screws or the like.

Preferably, when viewed in the vehicle seat width direction, the adapter element is arranged between the backrest and the seat part, the tilt adjustment device being arranged between the adapter element and the seat part.

According to a particularly preferred embodiment, the first angle is 0° or 180°. This means that the first recess extends in the backrest length direction.

The problem addressed is also solved by a method according to claim 10. In this case, the core concept is to provide a method for connecting a region, which is lower when viewed in the vehicle seat height direction, of a backrest to a region, which is rear when viewed in the vehicle seat length direction, of a seat part of a vehicle seat, a tilt adjustment device which is rotatable about a first axis of rotation extending in the vehicle seat width direction for adjusting a tilt of the backrest relative to the seat part being connected to the seat part, wherein the device comprises an adapter element which is rigidly connected to the tilt adjustment device and is rotatable about the first axis of rotation, which adapter element has a first recess which extends at a first angle to a backrest length direction, the first recess being connected to a first tab which is arranged on the backrest and is formed so as to be complementary to the first recess.

According to a particularly preferred embodiment, the device further comprises a bolt element and a coil spring, which has a first coil spring end which is connected to the bolt element, after connecting the first recess to the first tab, a preload of the coil spring being adjusted in a one-off assembly step.

The one-off assembly step in this case includes the steps of (a) rotating the backrest forwards in the vehicle seat length direction, (b) rotating the backrest backwards.

The coil spring is firstly placed on the bolt element so that the first coil spring end is connected in a stationary manner to the bolt element. In this case, the second coil spring end is not in operative contact with either the first or the second stop element. In particular, when viewed in the length direction, the second coil spring end is arranged in front of the first and second stop elements, the second stop element being arranged in front of the first stop element.

In this case, in step (a), the second coil spring end is forcibly guided along the first stop element until the second coil spring end jumps over the second stop element, in particular a second stop region. The fundamental preload of the coil spring is adjusted. However, the second coil spring end is now located between the first and the second stop element, and therefore up to this point, only operative contact of the second coil spring end with the second stop element is possible. In order to allow operative contact with the first stop element, it is necessary for the second coil spring end, when viewed in the length direction, to be arranged behind both the first and second stop elements.

This is established in step (b) in that the backrest, when viewed in the length direction, is rotated backwards again. Since, in step (a), the second coil spring end is arranged between the first and the second stop element, by rotating the backrest backwards, the first stop element is moved forwards. The second coil spring end moves in a forcibly guided manner on the second stop element and also jumps over the first stop element.

Further advantageous embodiments can be found in the dependent claims.

BRIEF DESCRIPTION OF THE DRAWINGS

Further aims, advantages and expedient uses of the present invention can be found below from the description in conjunction with the drawings, in which.

In the drawings, like components are each to be provided with corresponding reference numerals. For the sake of greater clarity, in some drawings components may not be provided with a reference numeral, but have been denoted at another point.

DETAILED DESCRIPTION

Figure 1A:
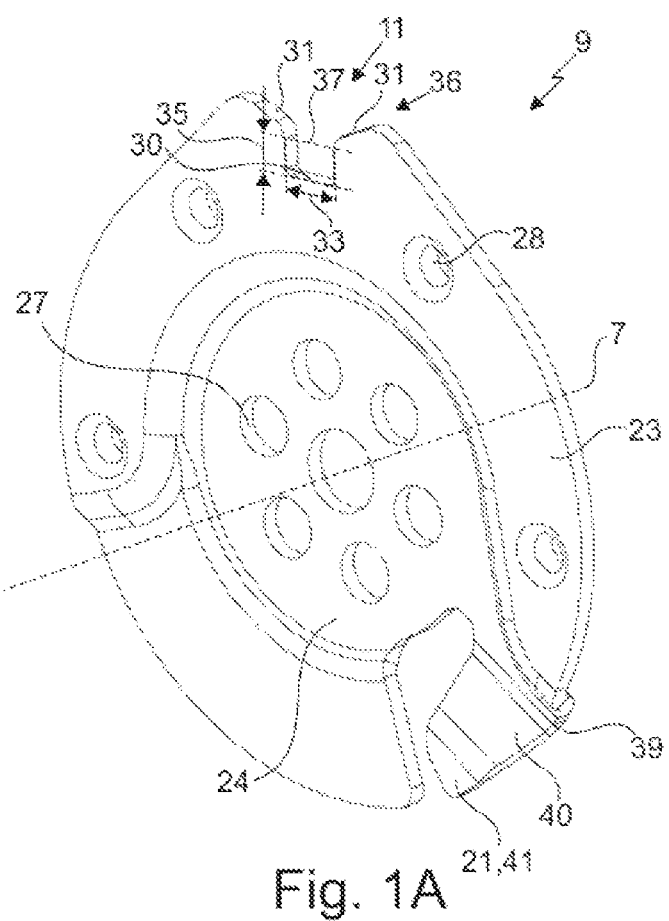
FIG. 1A shows an adapter element of a device according to a preferred embodiment.
Figure 1B:
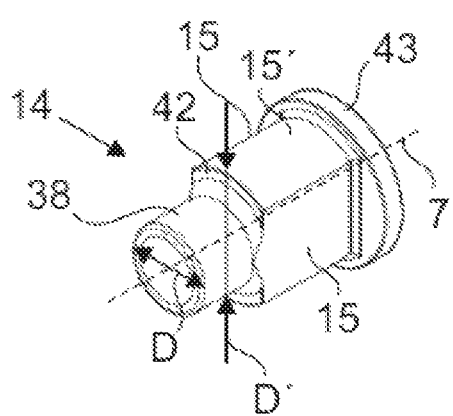
FIG. 1B shows a bolt element of a device according to a preferred embodiment.
Figure 1C:
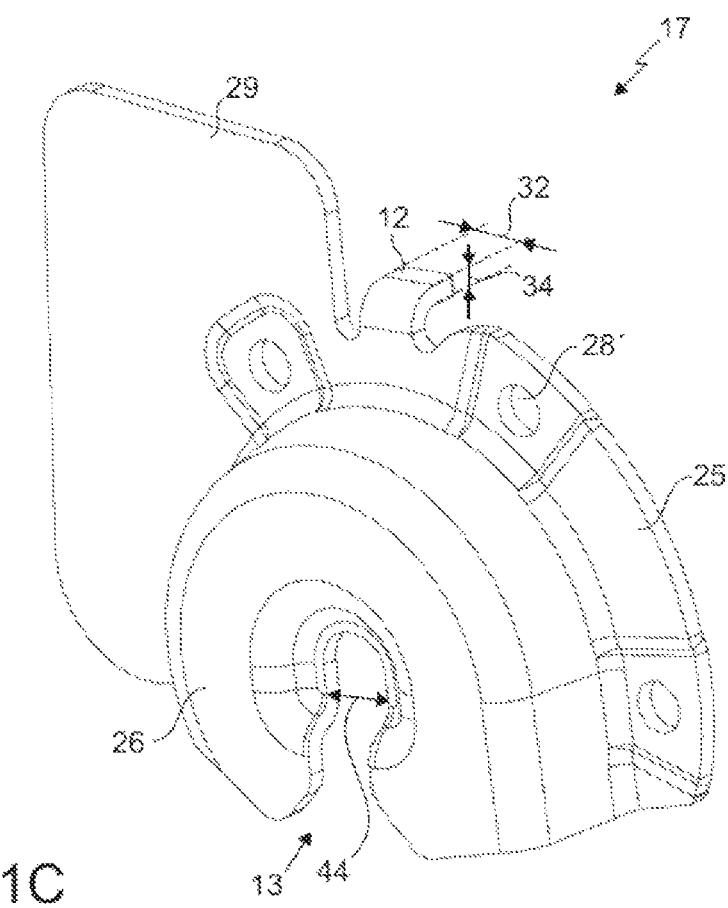
FIG. 1C shows an adapter housing of a device according to a preferred embodiment.

FIG. 1A-1C show various components of a device 1 according to a particularly preferred embodiment. In this case, FIG. 1A shows an adapter element 9, FIG. 1B shows a bolt element 14, and FIG. 1C shows an adapter housing 17.

According to the invention, the adapter element 9 is rigidly connected to a tilt adjustment device 8 (not shown here). For this purpose, the adapter element 9 preferably comprises at least a first connection point 27 which can be connected, in particular can be welded, to first complementary connection points 27' (not shown here). The connection points 27, 27' are used in particular to position the adapter element 9 relative to the tilt adjustment device 8. By means of the rigid connection to the tilt adjustment device 8, the adapter element 9 is likewise arranged so as to be able to rotate about the first axis of rotation 7.

Further according to the invention, the adapter element 9 comprises a first recess 11 which can be connected to a first tab 12. Preferably in this case, the first recess 11 comprises a central region 30 and at least one lateral region 31, in the present case two lateral regions 31. In this case, the dimensions of the central region 30 are formed in such a way that a width 31 of the tab 12 substantially corresponds to a width 33 of the central region 30. Furthermore, a height 35 of the recess 11 is greater than a height 34 of the tab 12.

In the present case, the recess 11 is substantially funnel-shaped or formed in the shape of a funnel 36, in a plan view of the adapter element, the central region 30 having a substantially rectangular shape. In a plan view of the adapter element 9, the lateral regions 31 form the sides of a trapezium in this case, the shorter base 37 of the trapezium forming a side of the rectangle of the central region 30.

Furthermore, according to FIG. 1A, it can be seen that the adapter element 9 comprises a first region 23 and a second region 24, the first region 23 extending in a first plane, and the second region 24 extending in a second plane, the first plane being formed in parallel with the second plane.

Furthermore, the adapter element 9 comprises a first stop element 21 which is connected to the second region 24 of the adapter element 9 by an initial region 39, and comprises a central region 40 and an end region 41. In particular, the central region 40 extends inter alia in the direction of the first axis of rotation 7 away from the second region 24. The central region 40 merges into an end region 41 which preferably extends in a third plane, the third plane being parallel to the first plane, and the first plane being arranged between the third and the second plane.

Furthermore, from FIG. 1A it can be seen that the first region 23 comprises at least one second connection point 28 which can be connected to second connection points 28' of the first region 25 of the adapter housing 17 by means of a connection, for example by a screw connection or the like.

In this case, FIG. 1B shows a bolt element 14 which can be rigidly connected to the adapter element 9 by a connection portion 43 so that the bolt element 14 can likewise be rotated about the first axis of rotation 7. Preferably, the connection portion 43 is welded to the adapter element 9. Furthermore, the bolt element 14 comprises a portion which has at least one planar region 15 and one circular region 15' having a diameter D'. In the present case, two planar regions 15 of this type are arranged. Furthermore, the bolt element 14 comprises a cylindrical portion 38 which adjoins the portion comprising the planar regions 15. The cylindrical portion 38 has a diameter D which corresponds to a width 44 of a second recess 44.

In this case, the second recess 13 is formed similarly to the first recess 11, and thus likewise comprises a central region, which, in the present case however, is formed to be substantially circular, and a funnel.

By means of the funnel-shaped design, firstly the first recess 11 can be connected to the first tab 12 more easily, and secondly the second recess 13 can be connected to the bolt element 14 more easily.

Furthermore, the bolt element comprises a transition region 42 between the portion having planar regions 15 and the cylindrical region 38.

In particular, the diameter D of the cylindrical region 38 amounts to at most a distance between the currently two planar regions 15 formed in parallel with one another of the bolt element 14.

Furthermore, the adapter housing 17 comprises an adapter plate 29, by means of which the adapter housing 17 can be connected to the backrest 2.

Figure 2:
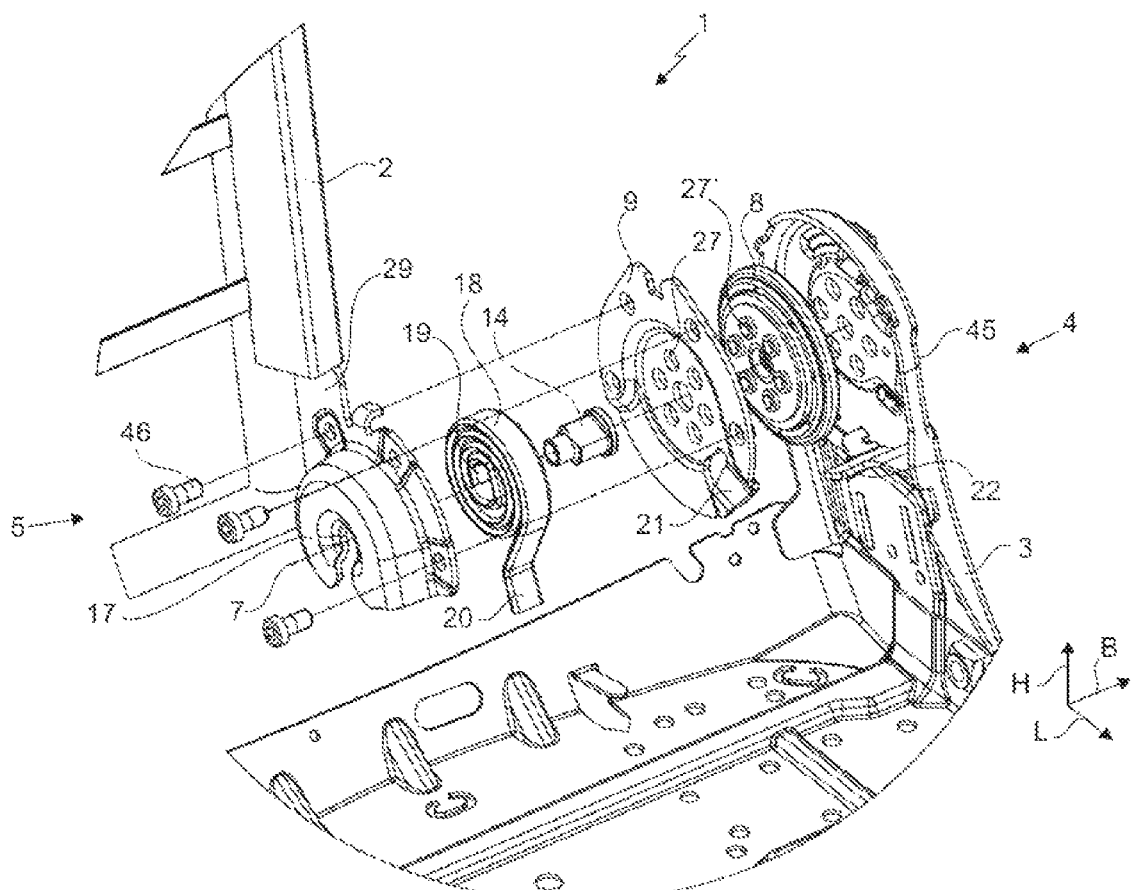
FIG. 2 is an exploded view of a device according to a preferred embodiment.

In this case, FIG. 2 shows a device 1 according to a preferred embodiment and a backrest 2 as well as a seat part 3. In the rear region 4 thereof, the seat part 3 comprises in particular a portion 45 extending in the vehicle seat height direction H. A tilt adjustment device 8 is rigidly connected to the seat part 3 and in the present case, to the portion 45.

The adapter housing 17 is connected to the backrest 2 by means of the adapter plate 29. Furthermore, the adapter element 9 is arranged on the tilt adjustment device 8, at least the first connection points 27 being rigidly connected to the first complementary connection points 27' so that the adapter element 9 is rigidly connected to the tilt adjustment device 8.

The bolt element 14 is rigidly connected to the adapter element 9, and a coil spring 18 is connected to the bolt element 14, which spring comprises a first coil spring end 19 and a second coil spring end 20. In this case, the first coil spring end 19 is formed so as to correspond to the portion having planar regions 15 of the bolt element 14 and is dimensioned in such a way that the first coil spring end 19 surrounds, in an interlocking manner, the portion having planar regions 15.

Furthermore, the adapter housing 17 and the adapter element 9 are interconnected by screws 46. In particular, additional detachable connections are also conceivable so that the backrest 2 can be detached from seat part 3 again easily and rapidly.

In addition, the seat part 3 also comprises a second stop element 22.

The adapter housing 17, together with the first tab 12 and the second recess 13, are connected as a first assembly 50 to the backrest 2, the tilt adjustment device 8, the adapter element 9 and the bolt element are connected as a second assembly 51 to the seat part 3.

By arranging and configuring the first 11 and second 13 recesses, the first tab 12 and the bolt element 14 relative to one another, as shown in FIG. 3A-3D, the seat part 3 and the backrest 2 can easily be interconnected so that screwing together or the like is possible without greater effort.

Figure 3A:
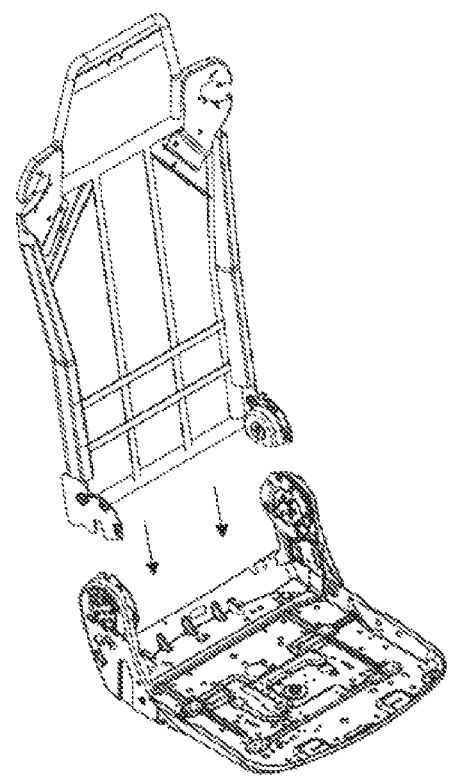
FIG. 3A shows a schematic connection of the backrest and a seat part by means of a device according to a particularly preferred embodiment.
Figure 3B:
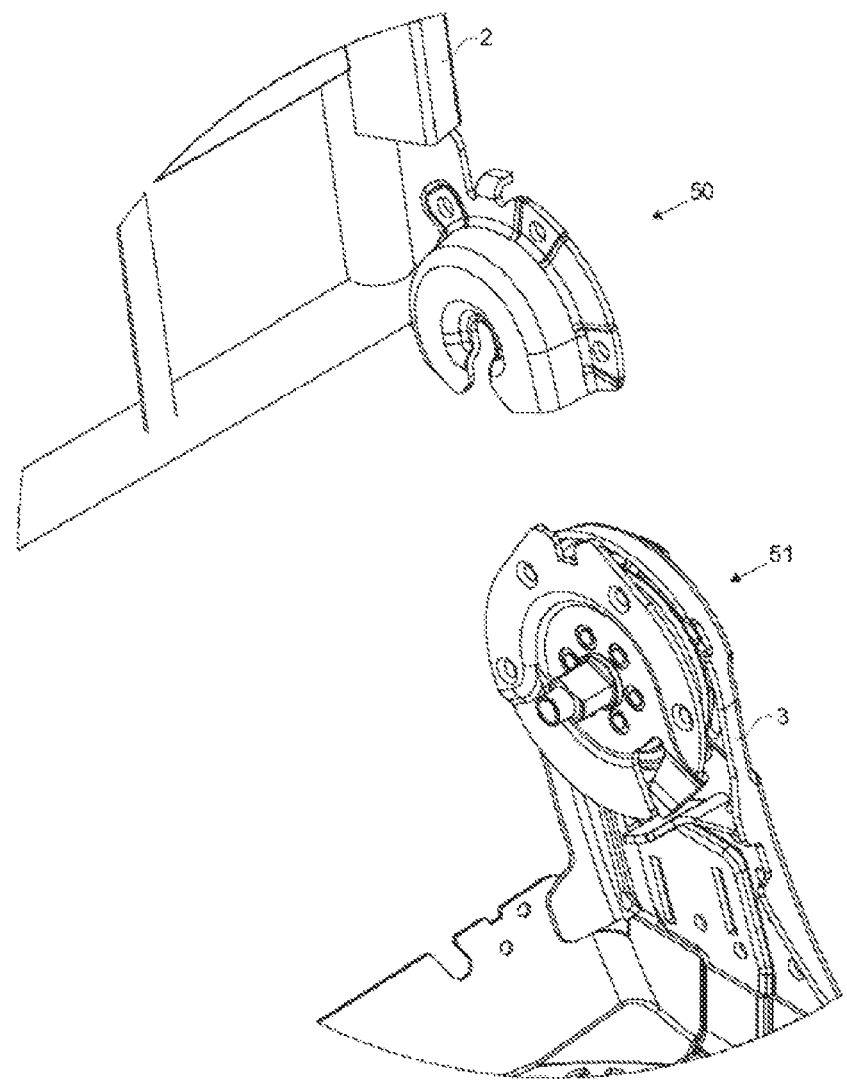
FIG. 3B shows a schematic connection of the backrest and a seat part by means of a device according to a particularly preferred embodiment.
Figure 3C:
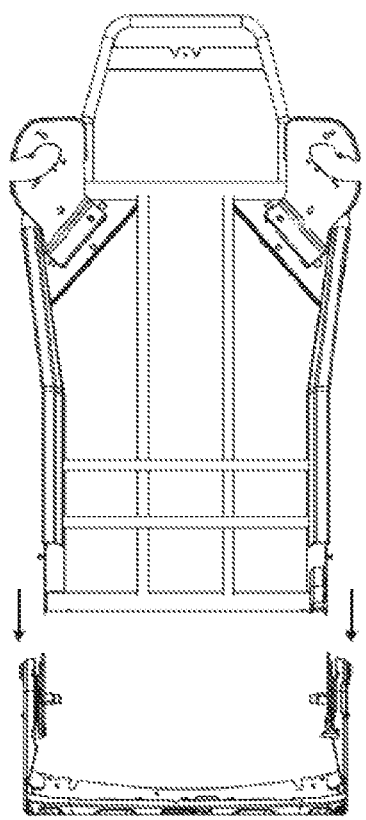
FIG. 3C shows a schematic connection of the backrest and a seat part by means of a device according to a particularly preferred embodiment.

As can be seen in particular from FIGS. 3A and 3C, two first assemblies 50 and two second assemblies 51 are provided. A coil spring 18 is arranged between the first assembly 50 and the second assembly 51, which spring is preloaded or not depending on the position of the backrest. The mode of operation of the coil spring 18 is described in greater detail below in connection with the following drawings.

Figure 3D:
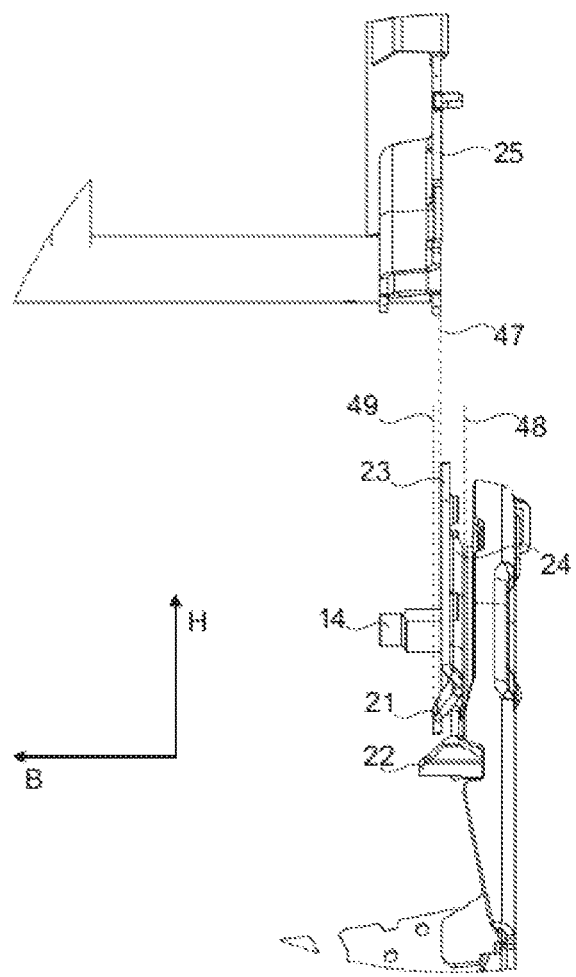
FIG. 3D is a front view of the device according to a preferred embodiment.

FIG. 3D shows the position of the first 47, the second 48 and the third 49 plane relative to one another. As can also be seen, the first region 25 of the adapter housing 17 also extends in the first plane 47.

Similarly to the first recess 11, the first stop 21 is also arranged at a specific third angle 52 relative to the backrest length direction RL. The second stop 22, which is arranged in a stationary manner relative to the seat part 3, is arranged at a constant fourth angle 53 relative to the vehicle seat height direction H.

If the backrest 2 is rotated about the first axis of rotation 7, then the angle between the backrest length direction RL and the vehicle seat height direction constantly changes. It can therefore occur that, when viewed in a radial direction away from the first axis of rotation 7, the first 21 and second 22 stop elements are arranged on the same radial stretch. In this case, the coil spring 18 has a certain preload.

In this case of the first 21 and second 22 stop elements coinciding, the coil spring 18, in particular the second coil spring end 20, is in operative contact with both the first 21 and the second 22 stop element. If the backrest 2 is now rotated further forwards in the vehicle seat length direction L, then the first stop element 21, and likewise the second coil spring end 20, is correspondingly rotated together therewith. As a result, the second coil spring end 20 still remains in contact with the first stop element 21, and at the same time, the contact between the second coil spring end 20 and the second stop element 22 is released.

As a result of the fact that the first coil spring end 19 is arranged in a stationary manner relative to the adapter element 9 by means of the bolt element 14, and likewise the first stop element 21 is arranged in a stationary manner on the adapter element 9, the preload of the coil spring is unchanged, and therefore the backrest 2 can be folded forwards without applying force.

If, however, the backrest 2 is moved backwards in the vehicle length direction L, then the situation changes. The second coil spring end 20 is still in operative contact with the second stop element 22, and the first stop element 21 is moved away from the second coil spring end 20. If the adapter element 9 with the coil spring 18 is rotated further backwards about the first axis of rotation 7, then the preload of the coil spring 18 is further changed, since the first coil spring end 19 is moved correspondingly to the adapter element 9, and the second coil spring end 20 is still in contact with the second stop element 22.

Figure 4A:
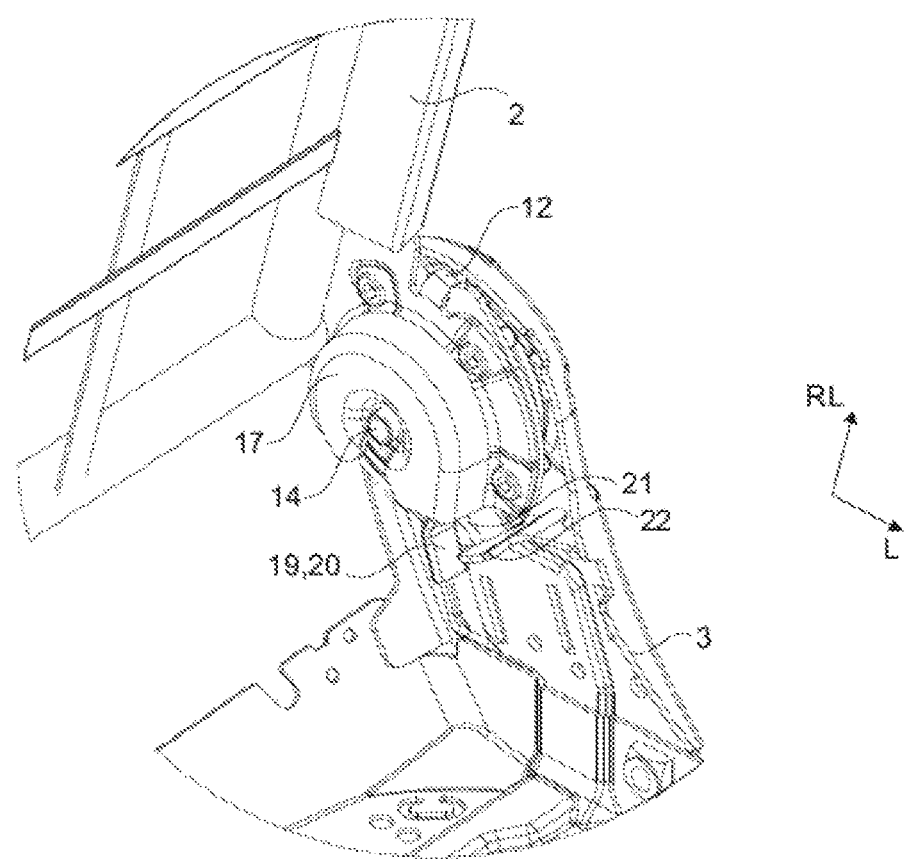
FIG. 4A shows the vehicle seat in a first position.
Figure 4B:
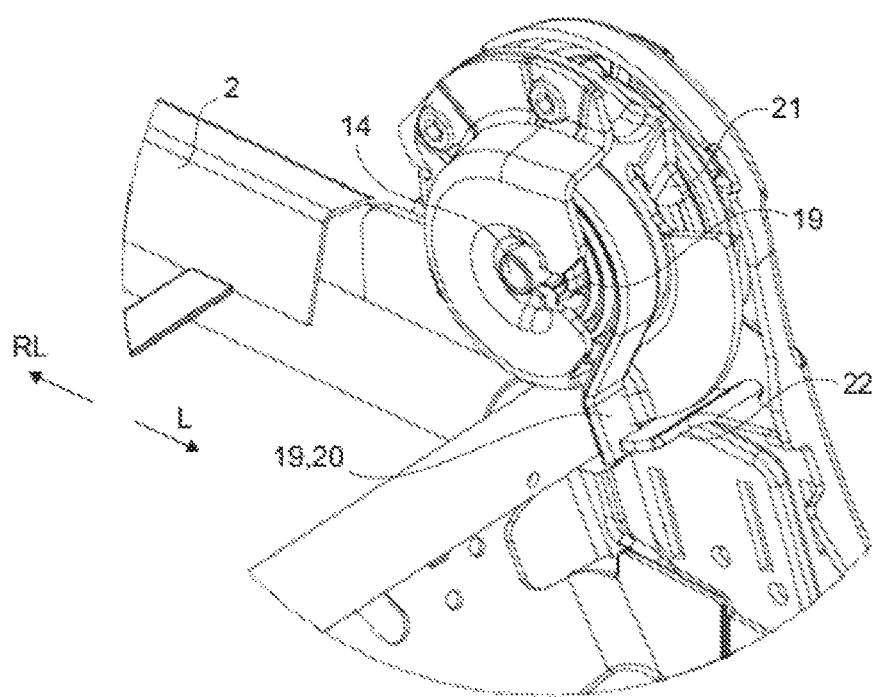
FIG. 4B shows the vehicle seat in a backwards-tilted position.
Figure 4C:
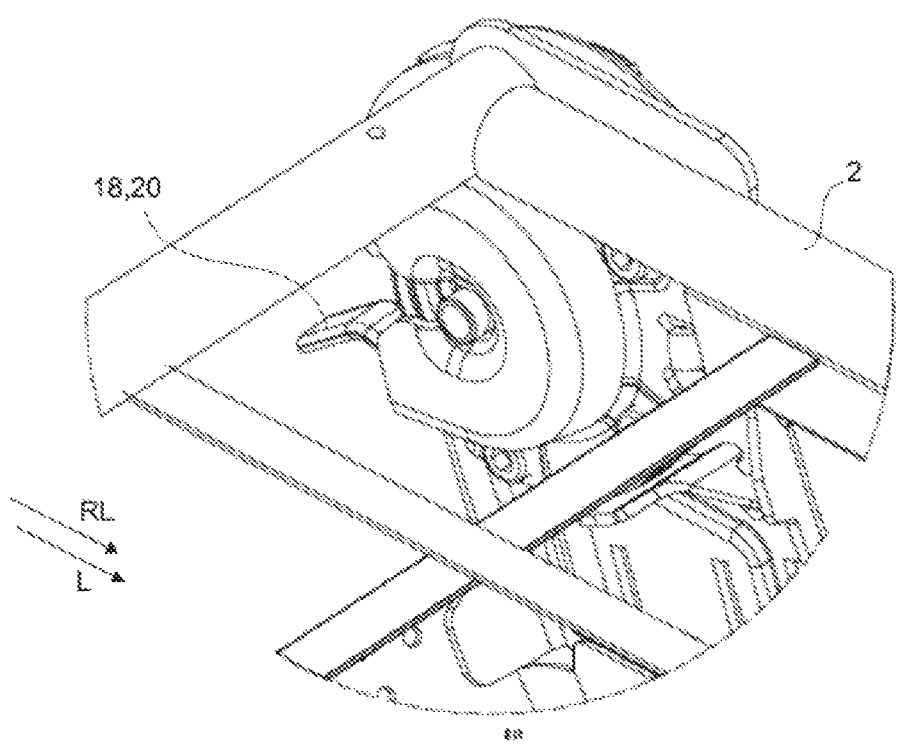
FIG. 4C shows the vehicle seat in a forwards-tilted position.

FIG. 4A to 4C show the various positions of the backrest 2 relative to the seat part 3 and the coil spring 18 in the positions.

FIG. 4A shows the coil spring 18 in contact with the first 21 and the second 22 stop element. In this situation, the backrest 2 is tilted forwards so that the backrest length direction RL encloses a fifth angle together with the vehicle seat length direction L, preferably an angle of approximately 80°. However, other fifth angles are of course also conceivable, said angles depending on the second angle 16, the third angle 52 and the fourth angle 53.

FIG. 4B shows the situation with a backrest 2 rotated backwards in the vehicle seat length direction L. As can be seen, the coil spring 18, in particular the second coil spring end 20, is in operative contact with the second stop element 22, the first stop element 21 has been rotated backwards correspondingly to the adapter element 9. As a result of the fact that the first coil spring end 19 is likewise rotated backwards, the spring preload of the coil spring 18 is changed so that force must be applied whilst moving the backrest 2 backwards.

FIG. 4C shows the situation with a backrest 2 rotated forwards so that the backrest length direction RL corresponds to the vehicle seat length direction L. As can be seen, the second coil spring end 20 is in operative contact exclusively with the first stop element 21. Therefore no additional force is required to rotate the backrest 2 forwards.

Figure 5:
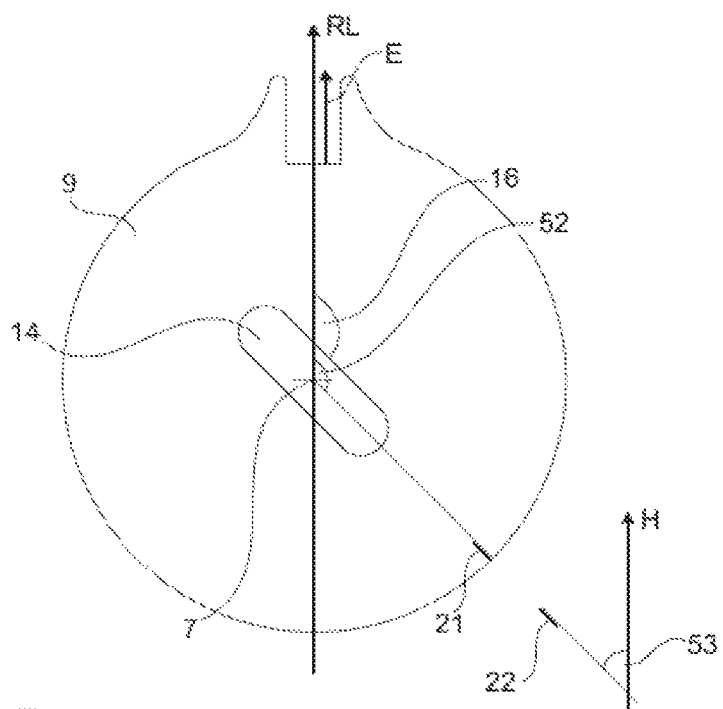
FIG. 5 is a schematic view of an adapter element comprising a bolt element.

In this case, FIG. 5 is a schematic overview of the first 10, second 16, third 52 and fourth 53 angles. In this case, the backrest length direction RL corresponds to the main extension direction of the backrest 2 which, during a rotation of the adapter element 9, is likewise rotated about the first axis of rotation 7.

Figure 6:
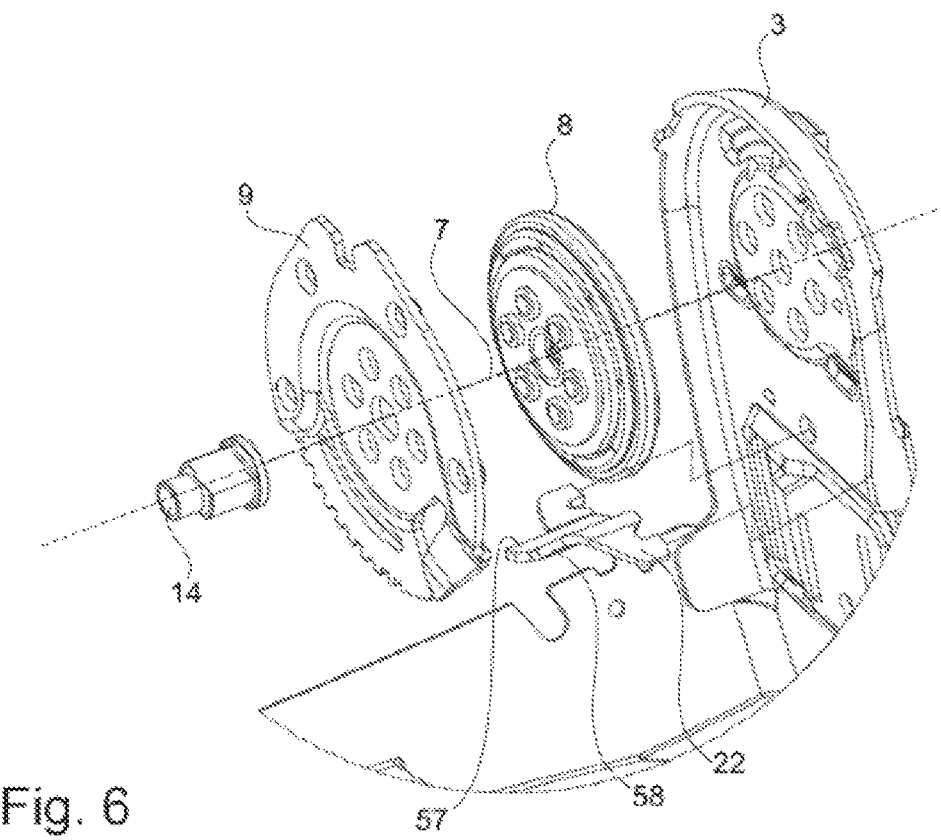
FIG. 6 shows the elements which are rigidly connected to the seat part.

FIG. 6 shows in particular the components of the device 1 which are rigidly connected to the seat part 3, in the present case the tilt adjustment device 8, the adapter element 9 and the bolt element 14, the bolt element 14 being rigidly connected to the adapter element 9, and the adapter element 9 being rigidly connected to the tilt adjustment device 8. Furthermore, the second stop element 22 can be seen, which is likewise rigidly connected to the seat part 3. Preferably, the rigid connection is a welded connection.

As can also be seen, the second stop element 22 comprises a widening region 58 which widens continuously in the axial direction of the axis of rotation 7 in the length direction L from front to back.

In this case, the second stop element 22 comprises a second stop region 57 which extends perpendicularly to the first axis of rotation 7 and in the axial direction of the axis of rotation 7.

Figure 7:
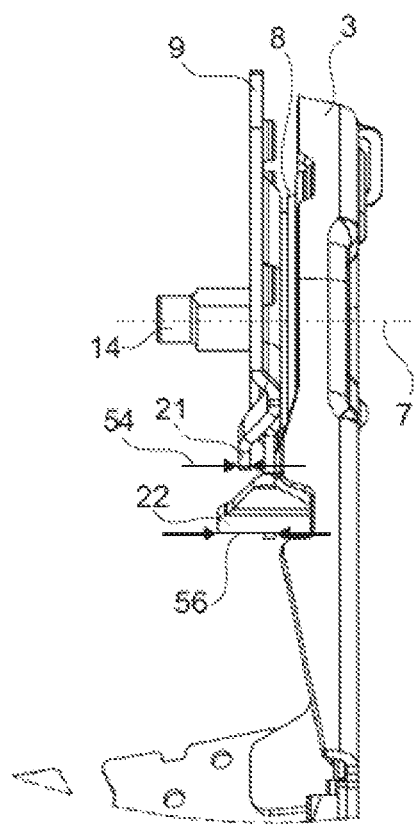
FIG. 7 is a front view of the elements from FIG. 6 in an assembled state.

The elements from FIG. 6 can be seen in FIG. 7 in a front view in an assembled state. As can be seen in particular, the axial extension 54 of the first stop element 21, in particular of the first stop region 55, is smaller than the axial extension 56 of the second stop element 22, in particular of the second stop region 49.

If the backrest 2 is rotated about the first axis of rotation 7, then the angle between the backrest length direction RL and the vehicle seat length direction L constantly changes. It can therefore occur that, viewed in a direction perpendicular to the first axis of rotation 7, the first 21 and second 22 stop elements are arranged on the same radial stretch. In this case, the coil spring 18 has a certain preload, but it is also conceivable for the coil spring 18 to have no preload.

In this case of the first 21 and second 22 stop elements coinciding, the coil spring 18, in particular the second coil spring end 20, is in operative contact with both the first 21 and the second stop element 22. If the backrest 2 is now rotated further forwards in the vehicle seat length direction L, then the first stop element 21, and likewise the second coil spring end 20, is accordingly rotated together therewith. As a result, the second coil spring end 20 still remains in contact with the first stop element 21, and at the same time, the contact between the second coil spring end 20 and the second stop element 22 is released.

As a result of the fact that the first coil spring end 19 is arranged in a stationary manner relative to the adapter element 9 by means of the bolt element 14, and likewise the first stop element 21 is arranged in a stationary manner on the adapter element 9, the preload of the coil spring is unchanged, and therefore the backrest 2 can be folded forwards without applying force.

If, however, the backrest 2 is moved backwards in the vehicle length direction L, then the situation changes. The second coil spring end 20 is still in operative contact with the second stop element 22, and the first stop element 21 is moved away from the second coil spring end 20. If the adapter element 9 with the coil spring 18 is rotated further backwards about the first axis of rotation 7, then the preload of the coil spring 18 is further changed, since the first coil spring end 19 is moved correspondingly to the adapter element 9, and the second coil spring end 20 is still in contact with the second stop element 22.

According to one embodiment, the coil spring 18 has a preload, according to the positions of the first 19 and second coil spring end 20, in particular of the second coil spring end 20 relative to the stop elements 21, 22. The fundamental preload of the coil spring 18 is defined in this case by the operative contact of the second coil spring end with the second stop element 22, since at least this preload is always present, as has already been described above. During a forward rotation of the backrest 2 in the vehicle length direction L, the fundamental preload is still present, whereas during a backwards rotation of the backrest 2, the preload is changed during rotation of the backrest 2.

However, during the assembly of the device 1 or of the vehicle seat 2, it is not advantageous to allow an operator to adjust a preload of the coil spring, since this can represent a significant risk for the operator.

Therefore, during the assembly, in order to adjust the preload of the coil spring 18, a one-off assembly step is carried out, the individual steps of which are described in greater detail below.

Figure 8A:
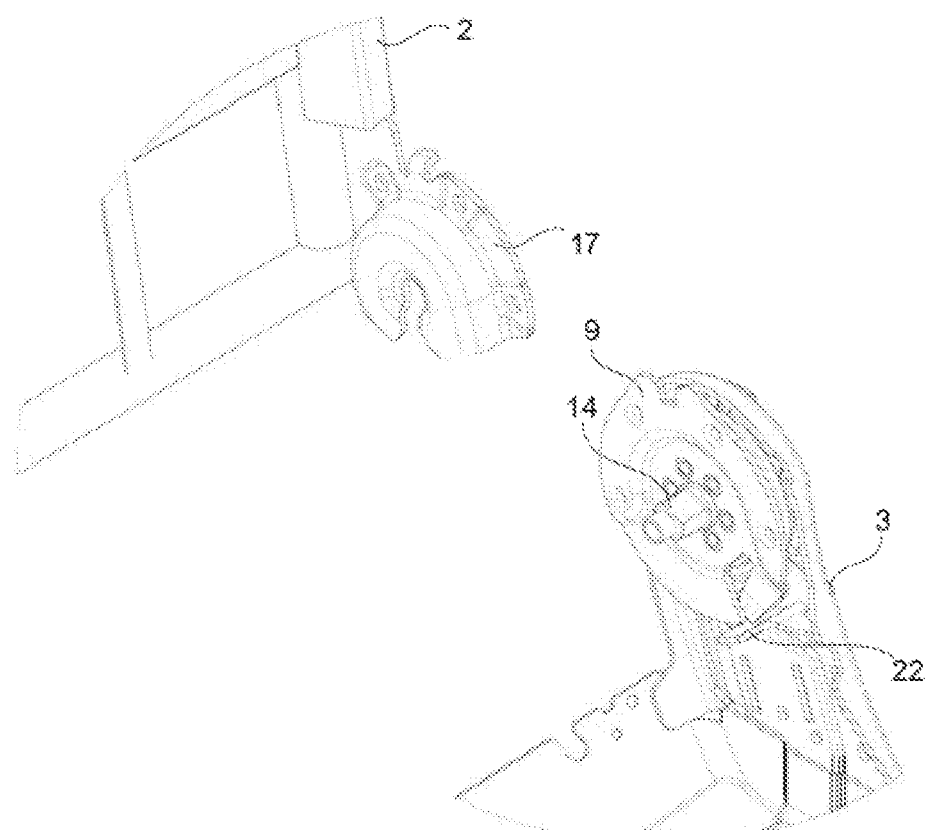
FIG. 8A-8H show a schematic procedure for producing a preload of the coil spring.

In a first step S1, shown in FIG. 8A, the respective components are accordingly applied to the backrest 2 or the seat part 3. In this case, the adapter housing 17 is rigidly connected to the backrest 2, and the tilt adjustment device 8, the adapter element 9 and the bolt element 14 are rigidly connected to the seat part 3. Likewise, the second stop element 22 is rigidly connected to the seat part 3.

Figure 8B:
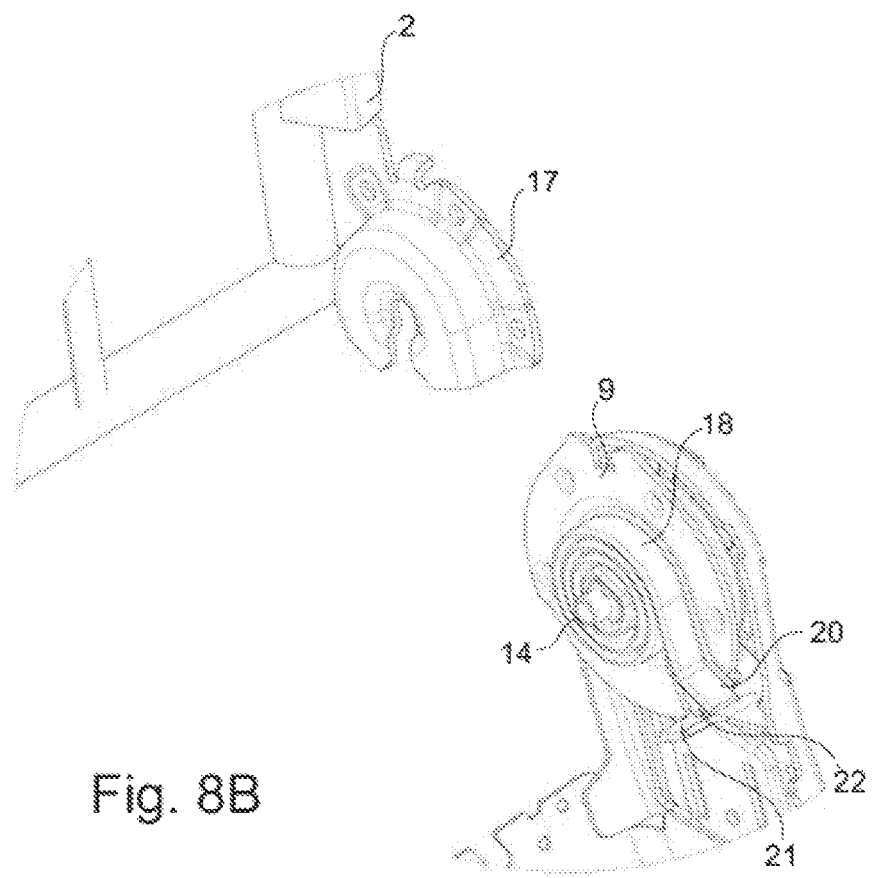

In a second step S2, shown in FIG. 8B, the coil spring 18 is placed on the bolt element 14 so that the first coil spring end 19 is connected in a stationary manner to the bolt element 14, but still has a degree of freedom in the axial direction of the first axis of rotation 7. As can be seen, the second coil spring end 20 is not in operative contact with either the first 21 or the second 22 stop element. In particular, when viewed in the length direction L, the second coil spring end 20 is arranged in front of the first 21 and second 22 stop elements, the second stop element 22 being arranged in front of the first stop element 21.

Figure 8C:
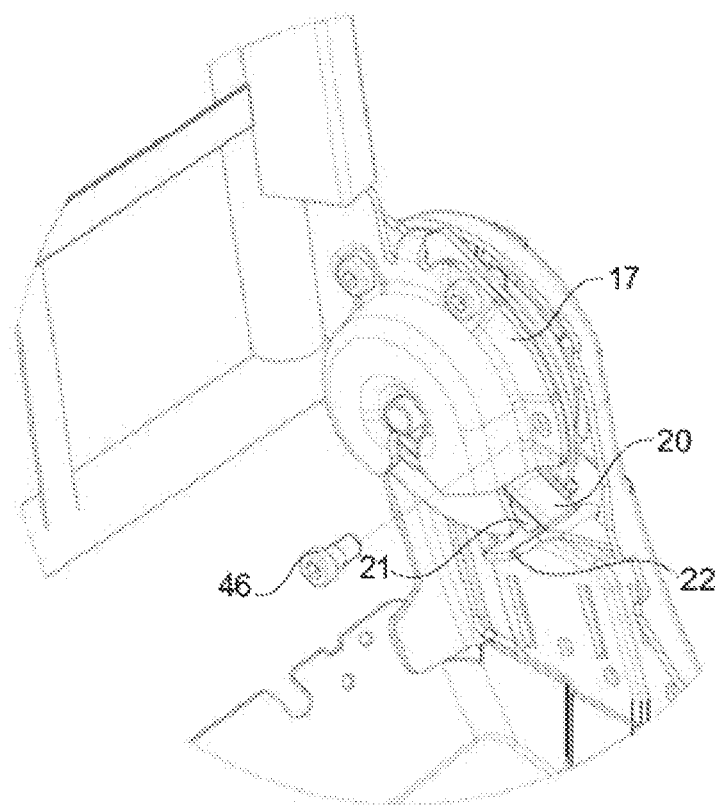

In a third step S3, shown in FIG. 8C, the adapter housing 17 is screwed to the adapter element 9 by screws 46, and the degree of freedom of the coil spring 18 in the axial direction is eliminated.

Figure 8D:
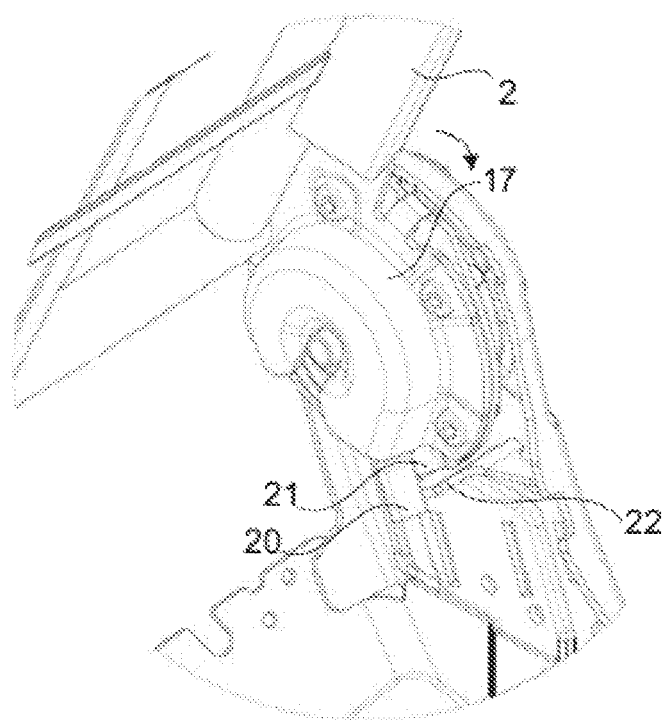
Figure 8E:
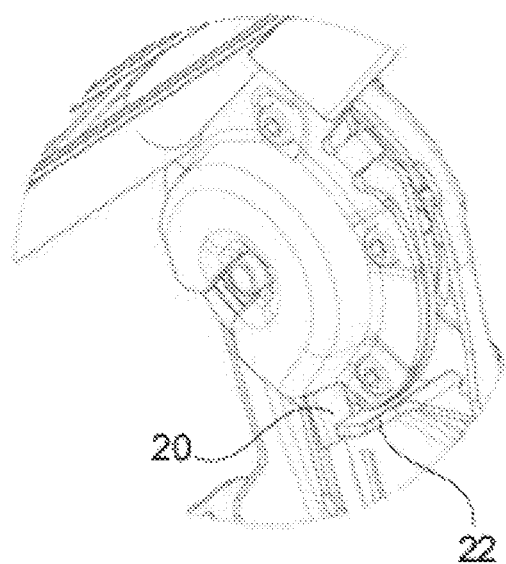

In FIG. 8D, a fourth step S4 is shown, in which the backrest 2 is rotated forwards in the vehicle seat length direction L. By designing the second stop element 22 with the widening region 58, the second coil spring end 20 is forcibly guided on the widening region 58 until the second coil spring end 20 has jumped over the second stop element 22, in particular the second stop region 57, as shown in FIG. 8E. The fundamental preload of the coil spring 18 has thus been adjusted. However, the second coil spring end 20 is now located between the first 21 and the second 22 stop element, and therefore up to this point, only operative contact of the second coil spring end 20 with the second stop element 22 is possible. In order to allow operative contact with the first stop element 21, it is necessary for the second coil spring end 20, when viewed in the length direction L, to be arranged behind both the first 21 and second 22 stop elements.

Figure 8F:
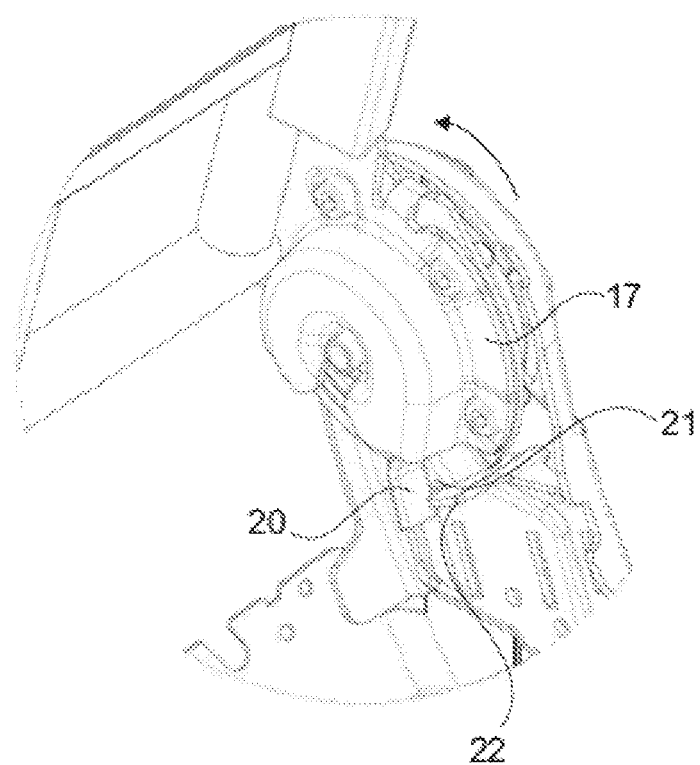
Figure 8G:
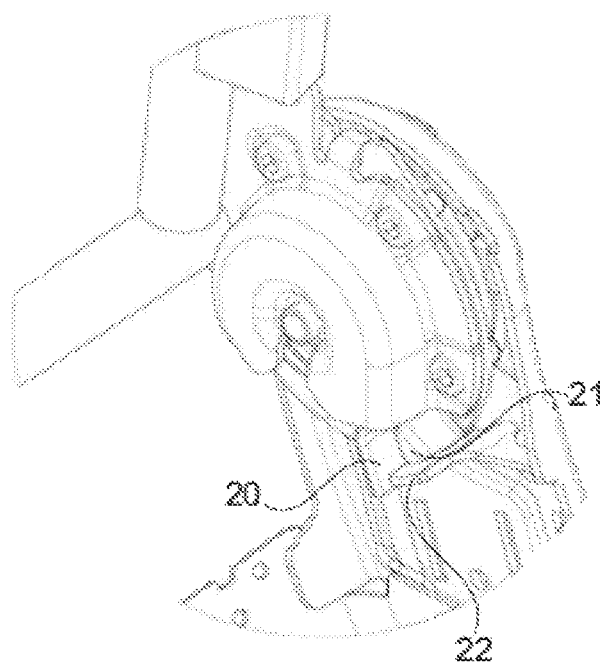

This is prepared in a step S5, shown in FIGS. 8F and 8G, in which the backrest 2, when viewed in the length direction L, is rotated backwards again. Since, in step S4, the second coil spring end 20 is arranged between the first 21 and the second 22 stop element, by rotating the backrest 2 backwards, the first stop element 21 is moved forwards. By designing the first stop element 21, in particular the central region 40, which is formed similarly to the widening region 58. Since the second stop element 22 extends further in the axial direction than the first stop element 21, the second coil spring end 20 is continuously held by the second stop element. The second coil spring end 20 moves in a forcibly guided manner on the central region 40 and also jumps over the first stop element 21.

Figure 8H:
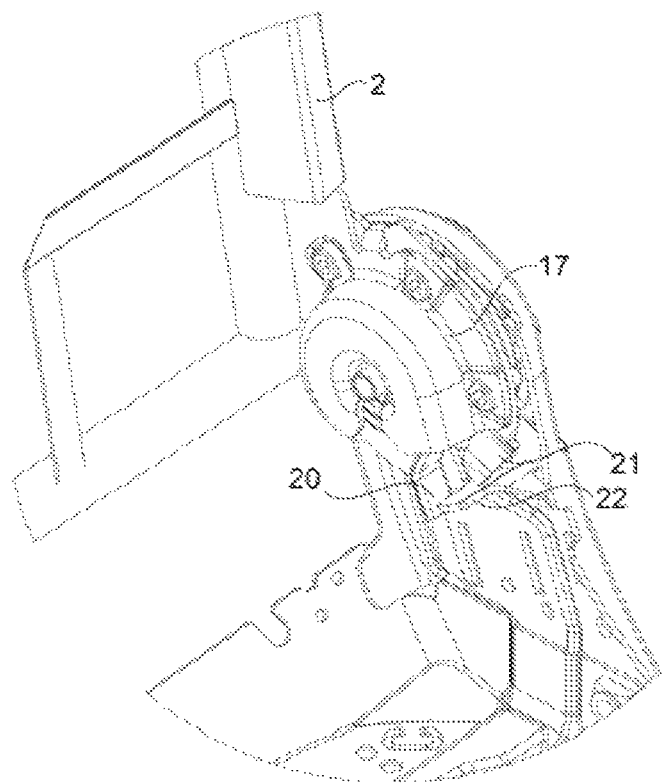

In a final step S6, shown in FIG. 8H, the backrest is brought into a position in which the backrest length direction RL and the vehicle seat length direction L have an angle of 90°. The angle between the first direction 48 and the second direction 50 in this case is greater than 0°, preferably 10°.

All of the features disclosed in the application documents are claimed as essential to the invention, if they are novel individually or in combination over the prior art.

LIST OF REFERENCE NUMERALS 1 device
2 backrest
3 seat part
4 rear region of the seat part
5 lower region of the backrest
6 vehicle seat
7 first axis of rotation
8 tilt adjustment device
9 adapter element
10 first angle 11 recess
12 first tab
13 second recess
14 bolt element
15 planar region
16 second angle
17 adapter housing
18 coil spring
19 first coil spring end
20 second coil spring end
21 first stop element
22 second stop element
23 first region of the adapter element
24 second region of the adapter element
25 first region of the adapter housing
26 second region of the adapter housing
27 first connection point
27' first complementary connection point
28, 28' second connection point
29 adapter plate
30 central region
31 lateral region
32 tab width
33 central region width
34 tab height
35 central region height
36 funnel
37 short base
38 cylindrical portion
39 initial region
40 central region
41 end region
42 transition region
43 connecting portion
44 second recess width
45 upwards-extending portion
46 screw
47 first plane
48 second plane
49 third plane
50 first assembly
51 second assembly
52 third angle
53 fourth angle
54 axial extension
55 first stop region
56 axial extension
57 second stop region
58 widening region

What is claimed is:

1. A device for connecting a backrest to a seat part of a vehicle seat, comprising:
 a tilt adjustment device, wherein the tilt adjustment device is rotatable about a first axis of rotation extending in a vehicle seat width direction for adjusting a tilt of the backrest relative to the seat part; and
 an adapter element, wherein the adapter element is rigidly connected to the tilt adjustment device and is rotatable about the first axis of rotation, wherein the adapter element has a first recess that includes two lateral regions that form an opening that is oriented at a first angle to a backrest length direction, the first recess being formed to receive a first tab that is fixed to the backrest.

2. The device according to claim 1, wherein the backrest has a second recess in contact with a bolt element that is rigidly connected to the adapter element and is arranged so as to be able to rotate about the first axis of rotation.

3. The device according to claim 2, wherein the bolt element comprises at least one planar region that, when viewed in the vehicle seat width direction, encloses a second angle together with the backrest length direction.

4. The device according to claim 2, wherein an adapter housing is fixed to the backrest, wherein the adapter housing comprises the first tab and the second recess, and wherein the adapter housing is connected to the adapter element.

5. The device according to claim 1, wherein when viewed in the vehicle seat width direction, the adapter element is configured to be arranged between the backrest and the tilt adjustment device, wherein the tilt adjustment device is configured to be arranged between the adapter element and the seat part.

6. The device according to claim 2, wherein the device further comprises a coil spring, wherein the coil spring is connected to the bolt element by a first coil spring end, and wherein a second coil spring end interacts with one or both of a first stop element of the adapter element and a second stop element of the seat part.

7. The device according to claim 6, wherein the coil spring is configured to be arranged between the backrest and the adapter element.

8. The device according to claim 1, wherein the adapter element comprises a first and a second region, wherein the first region is arranged in a first plane, wherein the second region is arranged in a second plane, and wherein the first plane and the second plane are parallel to one another.

9. The device according to claim 1, wherein the first angle is either 0° or 180°.

10. A method for connecting a backrest to a seat part of a vehicle seat, comprising:
 connecting a tilt adjustment device that is rotatable about a first axis of rotation extending in the vehicle seat width direction for adjusting a tilt of the backrest relative to the seat part to the seat part; and
 rigidly connecting an adapter element to the tilt adjustment device, wherein the adapter element has a first recess that includes two lateral regions that form an opening that is oriented at a first angle to a backrest length direction, the first recess being connected to a first tab that is arranged on the backrest and that is formed so as to be complementary to the first recess.

* * * * *